United States Patent
Clapp

(10) Patent No.: US 10,631,020 B2
(45) Date of Patent: Apr. 21, 2020

(54) MEDIA ASSET DUPLICATION

(71) Applicant: Piksel, Inc., Wilmington, DE (US)

(72) Inventor: Matt Clapp, Coronado, CA (US)

(73) Assignee: Piksel, Inc., Wilmington, DE (US)

( * ) Notice: Subject to any disclaimer, the term of this patent is extended or adjusted under 35 U.S.C. 154(b) by 0 days.

(21) Appl. No.: 15/791,338

(22) Filed: Oct. 23, 2017

(65) Prior Publication Data

US 2018/0048922 A1    Feb. 15, 2018

Related U.S. Application Data

(63) Continuation of application No. 14/276,705, filed on May 13, 2014, now Pat. No. 9,800,904.

(51) Int. Cl.
| | | |
|---|---|---|
| *H04N 21/231* | (2011.01) | |
| *H04N 21/61* | (2011.01) | |
| *H04N 21/2343* | (2011.01) | |

(52) U.S. Cl.
CPC . *H04N 21/23116* (2013.01); *H04N 21/23113* (2013.01); *H04N 21/23439* (2013.01); *H04N 21/234309* (2013.01); *H04N 21/234363* (2013.01); *H04N 21/6118* (2013.01); *H04N 21/6125* (2013.01); *H04N 21/6143* (2013.01)

(58) Field of Classification Search
CPC .......... H04N 7/17336; H04N 7/17318; H04N 21/47202; H04N 7/17354; H04N 21/21; H04N 21/23116; H04N 21/6125; H04N 21/234363; H04N 21/234309; H04N 21/23113; H04N 21/6143; H04N 21/23439; H04N 21/6118
See application file for complete search history.

(56) References Cited

U.S. PATENT DOCUMENTS 9,800,904 B2    10/2017    Clapp
2006/0020984 A1    1/2006    Ban et al.
(Continued)

OTHER PUBLICATIONS

European Search Report for counterpart application EP 15 16 7669, dated Jul. 31, 2015.
(Continued)

*Primary Examiner* — Anthony Bantamoi
(74) *Attorney, Agent, or Firm* — Hamilton, Brook, Smith & Reynolds, P.C.

(57) ABSTRACT

A content delivery system comprising: a receiving module for receiving a media asset in a received format; a transcoder configured to transcode the asset to provide a predetermined number of transcoded versions of the asset in at least one consumption format; a data store for storing the predetermined number of transcoded versions; a transmitting module coupled to said data store and configured to retrieve one of the predetermined number of transcoded versions from the data store and transmit the retrieved transcoded version to a media consuming device in response to detecting selection of the media asset by a content consumer associated with the device; a media asset duplication module configured, in response to detecting transmission of each transcoded version of the predetermined number of transcoded versions to respective one or more media consuming devices, to create a duplicate of the transcoded version and store the duplicate in the data store.

16 Claims, 3 Drawing Sheets

(56) References Cited

U.S. PATENT DOCUMENTS

| | | |
|---|---|---|
| 2006/0026302 A1 | 2/2006 | Bennett et al. |
| 2008/0019666 A1 | 1/2008 | Kato et al. |
| 2008/0140947 A1* | 1/2008 | Slik .................. G06F 12/00 |
| | | 711/154 |
| 2008/0091845 A1 | 4/2008 | Mills et al. |
| 2009/0201988 A1 | 8/2009 | Gazier |
| 2011/0235991 A1* | 9/2011 | Luthra ................. H04N 5/765 |
| 2011/0307929 A1 | 12/2011 | Youssefmir et al. |
| 2012/0079528 A1 | 3/2012 | Trimper et al. |
| 2013/0142499 A1 | 6/2013 | Major et al. |
| 2013/0191858 A1 | 7/2013 | Kanojia et al. |
| 2014/0025837 A1* | 1/2014 | Swenson .......... H01L 29/06027 |
| | | 709/231 |
| 2015/0334430 A1 | 11/2015 | Clapp |

OTHER PUBLICATIONS

Notice of Allowance for U.S. Appl. No. 14/276,705 dated Jul. 17, 2017, "Media Asset Duplication".

* cited by examiner

MEDIA ASSET DUPLICATION

RELATED APPLICATION(S)

This application is a continuation of U.S. application Ser. No. 14/276,705, filed May 13, 2014. The entire teachings of the above application(s) are incorporated herein by reference.

TECHNICAL FIELD

The present invention relates to storage and delivery of media assets.

BACKGROUND

An ever-increasing quantity of media content is being produced that can be viewed by a content consuming user (content consumer) on a viewing device, such as a television ("TV") or similar.

In traditional television systems, media assets (television shows, movies etc.) are aired linearly in the sense that viewers must watch the media asset at the time it is scheduled to be broadcast, and on the channel it's presented on. A content consumer has no control over what is being viewed other than change the TV channel, adjust volume and adjust display settings. All content consumers watching a linear asset will see the same thing at the same time.

Further mechanisms are now available for delivering such content in addition to traditional delivery mechanisms. These further mechanisms allow viewing of non-linear media assets.

One delivery mechanism that allows viewing of non-linear media assets is the use of a Digital Video Recorder (DVR). The main elements of a DVR are storage (e.g. a hard drive) and a tuner. A DVR allows a content consumer to select to record a media asset that is aired linearly at a scheduled time, this recorded media asset is stored in the storage such that the media asset can be viewed by the content consumer at a time of their choice.

Another delivery mechanism that allows viewing of non-linear media assets is "on-demand" delivery to user devices such as smart-TVs, set-top boxes, smartphone or tablet devices, desktop computers, laptop computers etc. whereby a content consumer can stream media content (for online consumption) or download media content (for offline consumption) from a server over a network, such as the Internet or a cable TV network, at a time of their choosing. On-demand services are typically accessed by a user using a user device on which is executed suitable media client software such as a web-browser, media streaming or download application (or "app") e.g. provided by the broadcaster or service provider, or embedded software e.g. embedded in a set-top box provided by an operator of a cable TV network.

As used herein, a "media stream" refers to media data that is encoded and transmitted to a user device in a manner that enables the user device to begin outputting the media data to a user of the user device before the media data has been received in its entirety (that is, while the media stream is still being received at the user device). Typically, a user can begin streaming a media asset from any desired temporal point in that media asset (which may or may not be the start of that media asset) and the stream is received in real-time (that is at a data rate of at least one second of media per second of transmission time) so that later parts of the media asset are received at least as fast as earlier parts are consumed by the user.

When viewing a media asset recorded by a DVR or an on-demand media asset, unlike in traditional linear television systems the content consumer can select when to view the media asset, and may pause, rewind and fast-forward the viewing of the media asset. A certain type of on demand system called "catch-up TV" stores all aired content as on-demand assets immediately upon airing, allowing the viewer to simply watch any asset without the need to record it on their DVR. The viewer simply finds the asset, though whatever mechanism offered by the broadcaster, and watches it.

An individual piece of media content—equivalently referred to herein as a "media asset"—e.g. a video asset such as a film or episode of a television series may comprise both audio data and video data.

SUMMARY

The use of a DVR to view media assets is restrictive in that a content consumer may forget to record a particular media asset (that is aired as a linear media asset) that is of interest to them. Furthermore a DVR is limited in the number of media assets (aired linearly) that can be recorded at one time.

A provider of a content delivery system typically has a contractual agreement with a content owner/provider such that a media asset must be unique to a single content consumer. That is, the content delivery system has to ensure that no two content consumers ever view the same media asset.

The inventor has recognized that a particular challenge of moving from the DVR delivery mechanism to the "catch-up TV" on-demand delivery mechanism is that due to the contractual agreement with content owners/providers, the content delivery system would need a unique copy of every asset (that is aired linearly) for every content consumer using the content delivery system, regardless of whether they would ever view the content. This would require extremely large data storage and thus be financially expensive.

These challenges are addressed by the present disclosure.

According to one aspect of the present disclosure there is provided a content delivery system comprising: a receiving module for receiving a media asset in a received format; a transcoder configured to receive the media asset from the receiving module and transcode the media asset to provide a predetermined number of transcoded versions of the media asset in at least one consumption format; a data store for storing the predetermined number of transcoded versions of the media asset in the at least one consumption format; a transmitting module coupled to said data store and configured to retrieve one of the predetermined number of transcoded versions of the media asset from the data store and transmit the retrieved transcoded version to a media consuming device in response to detecting selection of the media asset by a content consumer associated with said media consuming device; and a media asset duplication module configured, in response to detecting transmission of each transcoded version of the predetermined number of transcoded versions of the media asset to respective one or more media consuming devices, to create a duplicate of the transcoded version and store the duplicate in the data store.

The transcoder may be configured to transcode the media asset to provide the predetermined number of transcoded versions of the media asset in at least one encoding format, and the media asset duplication module may be further configured, in response to detecting transmission of each transcoded version of the predetermined number of transcoded versions of the media asset, to detect the encoding format of the transmitted version and create the duplicate of the transcoded version in the detected encoding format.

The transcoder may be configured to transcode the media asset to provide the predetermined number of transcoded versions of the media asset in at least one resolution, and the media asset duplication module is further configured, in response to detecting transmission of each transcoded version of the predetermined number of transcoded versions of the media asset, to detect the resolution of the transmitted version and create the duplicate of the transcoded version in the detected resolution.

The transmitting module may be further configured to detect capabilities of each media consuming device associated with a content consumer that selected the media asset, and for each media consuming device the retrieved transcoded version of the media asset is selected for retrieval based on the detected capabilities of the media consuming device.

The detected capabilities may comprise information on at least one encoding format supported by the media consuming device. Alternatively or additionally, the detected capabilities comprise information on at least one resolution supported by the media consuming device.

Each transcoded version of the predetermined number of transcoded versions of the media asset may be deleted from the data store following retrieval of each of said transcoded version from the data store.

The deletion of the transcoded version of the media asset may occur after a predetermined period of time following retrieval from the data store, the predetermined period of time set by a provider of the content delivery system.

The receiving module may be configured to receive the media asset after the media asset has been broadcast as a linear asset.

The content delivery system may further comprise a media asset selection detection module configured to detect selection of the media asset by the content consumer associated with said media consuming device, and supply an indication of the media asset to the media asset transmitter.

The content delivery system may communicate with at least one of the one or more media consuming devices via a packet based connection.

The content delivery system may communicate with at least one of the one or more media consuming devices via a cable connection.

The content delivery system may communicate with at least one of the one or more media consuming devices via a satellite connection.

According to another aspect there is provided a computer implemented method of delivering content from a content delivery system, the method comprising: receiving a media asset at a receiving module in a received format; transcoding the media asset to provide a predetermined number of transcoded versions of the media asset in at least one consumption format; storing the predetermined number of transcoded versions of the media asset in the at least one consumption format in a data store;

retrieving one of the predetermined number of transcoded versions of the media asset from the data store and transmitting said retrieved transcoded version to a media consuming device in response to detecting selection of the media asset by a content consumer associated with said media consuming device; and in response to detecting transmission of each transcoded version of the predetermined number of transcoded versions of the media asset to respective one or more media consuming devices, creating a duplicate of the transcoded version and storing the duplicate in the data store.

According to another aspect there is provided a computer program product for delivering content from a content delivery system, the computer program product being embodied on a computer-readable medium and configured so as when executed on one or more processors to perform any of the methods described herein.

BRIEF DESCRIPTION OF THE DRAWINGS

For a better understanding of the present disclosure and to show how the same may be put into effect, reference will now be made, by way of example, to the following drawings in which.

Figure 1:
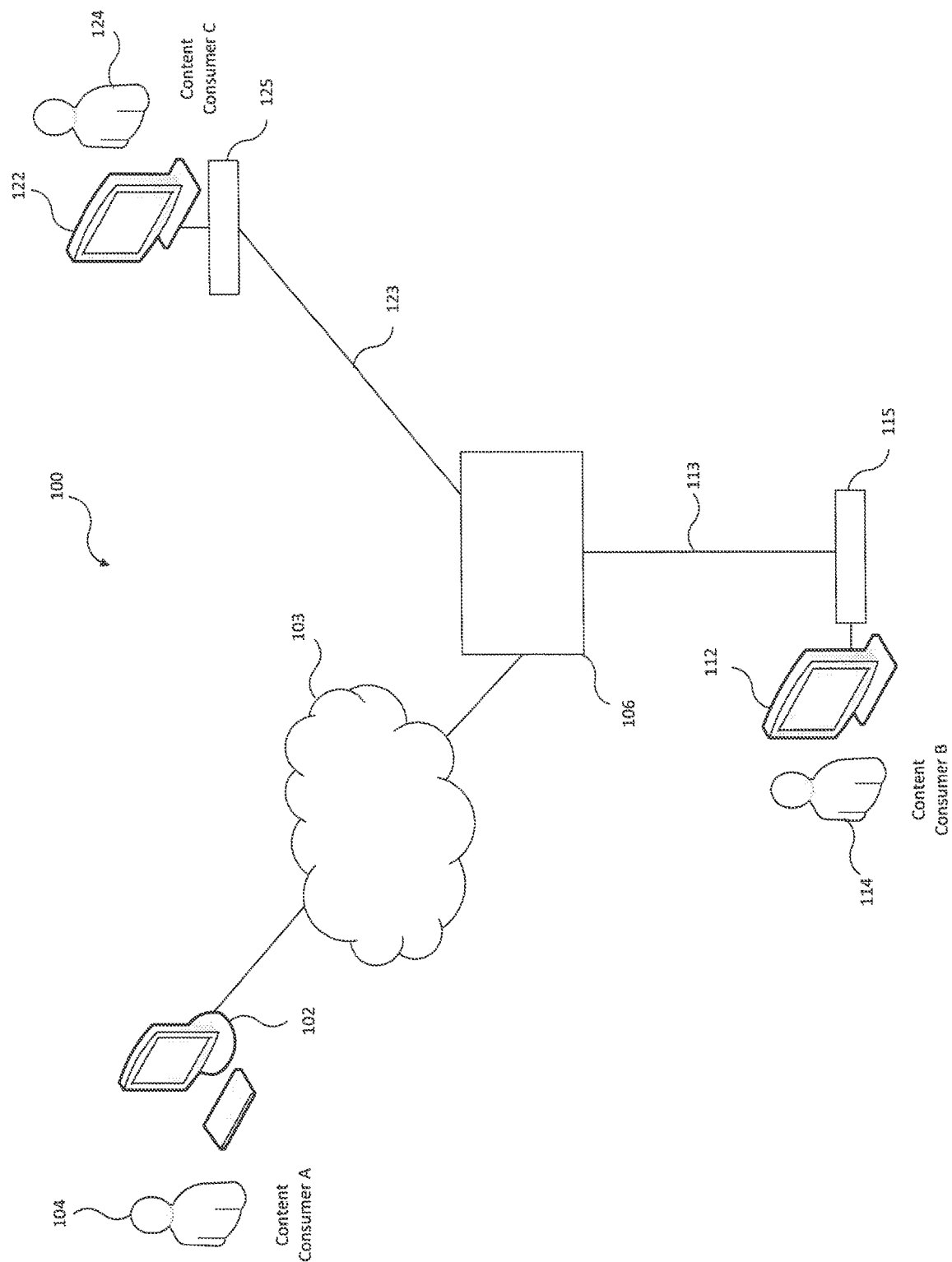
FIG. 1 illustrates a schematic view of a content delivery system coupled to media consuming devices.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

FIG. 1 illustrates a network 100 comprising a content delivery system 106.

A plurality of media consuming devices are shown in FIG. 1 as being coupled to the content delivery system 106.

FIG. 1 shows a first consumer 104 (content consumer A) associated with a first media consuming device 102, a second consumer 114 (content consumer B) associated with a second media consuming device 112, and a third consumer 124 (content consumer C) associated with a third media consuming device 122. Whilst only three content consumers are shown as being present for simplicity, this number of content consumers is merely an example and will typically be much higher.

A media asset may be delivered to a media consuming device using various communication mediums.

The content delivery system 106 is able to deliver a media asset via a packet-based network 103 to the first media consuming device 102. The packet-based network 103 may for example be the Internet. The first media consuming device 102 may be, for example, an internet enabled TV, mobile phone, a personal digital assistant ("PDA"), a personal computer ("PC") (including, for example, Windows™, Mac OS™ and Linux™ PCs), a tablet computer, a gaming device or other embedded device able to connect to the packet-based network 106. The user terminal 102 is arranged to receive information from and output information to the first consumer 104. The first media consuming device 102 may connect to the packet-based network 106 via an additional intermediate network not shown in FIG. 1. For example, if the first media consuming device 102 is a mobile device, then it can connect to the packet-based network 106 via a cellular mobile network (not shown in FIG. 1), for example a GSM or UMTS network.

The content delivery system 106 is able to deliver a media asset via a cable connection 113 to the second media consuming device 112. The second media consuming device 112 is coupled to a cable set-top box 115 which receives cable TV signals via the cable connection 113 and outputs the media content on the second media consuming device 112 which may for example be a TV. Whilst FIG. 1 shows the cable set-top box 115 as external to the second media consuming device 112, it will be appreciated that the functionality of the cable set-top box 115 may be incorporated into the second media consuming device 112.

The content delivery system 106 is able to deliver a media asset via a satellite connection 123 to the third media consuming device 112. The third media consuming device 112 is coupled to a satellite set-top box 115 which receives satellite TV signals via the satellite connection 123 and outputs the media content on the third media consuming device 122 which may for example be a TV. Whilst FIG. 1 shows the satellite set-top box 125 as external to the third media consuming device 122, it will be appreciated that the functionality of the satellite set-top box 125 may be incorporated into the third media consuming device 122.

Each of the media consuming devices referred to above comprises an output device for outputting a media asset. For example, the media consuming devices comprise a display for outputting video signals and one or more speakers for outputting audio signals.

Figure 2:
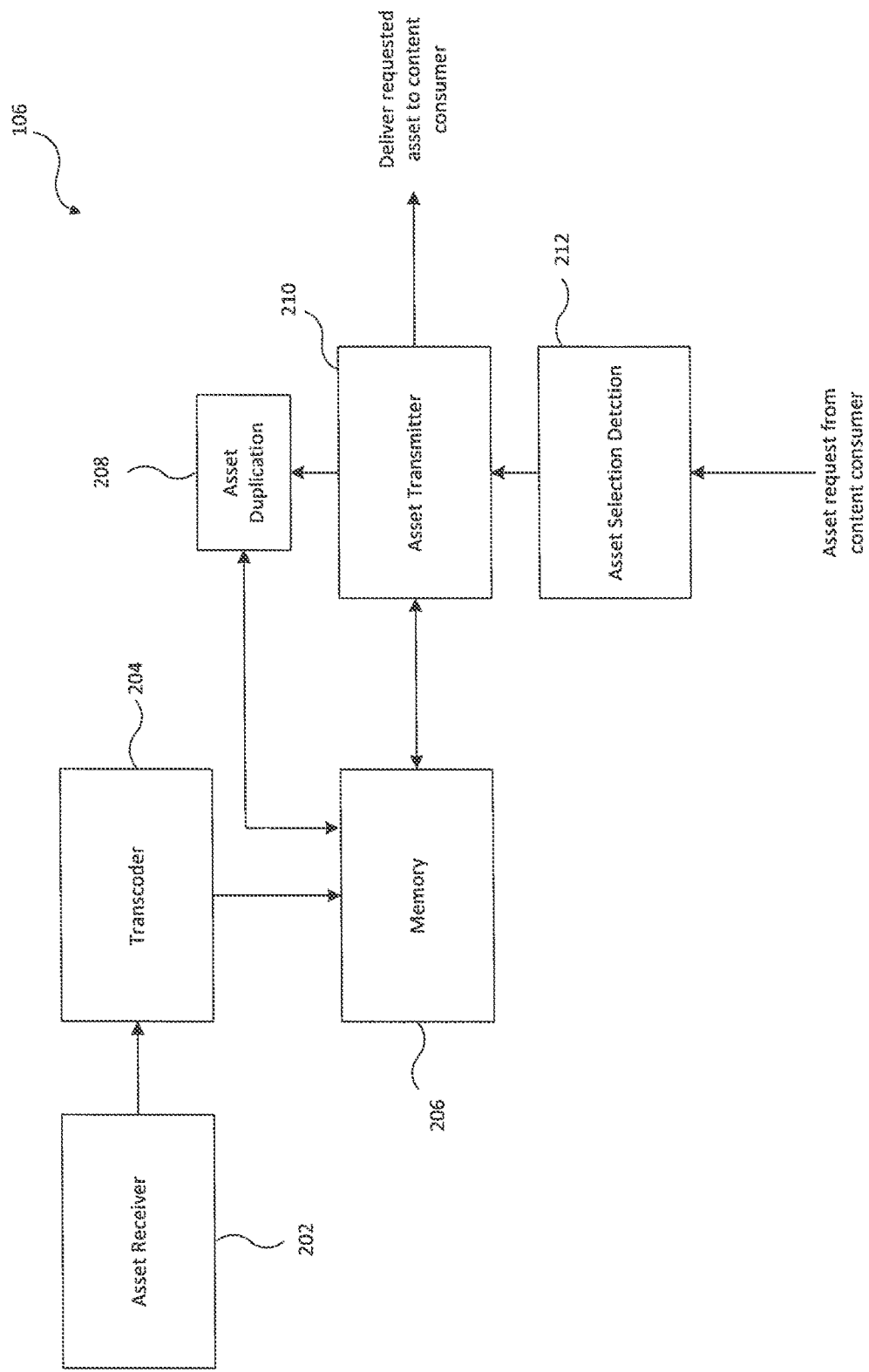
FIG. 2 shows a schematic view of a content delivery system.
Figure 3:
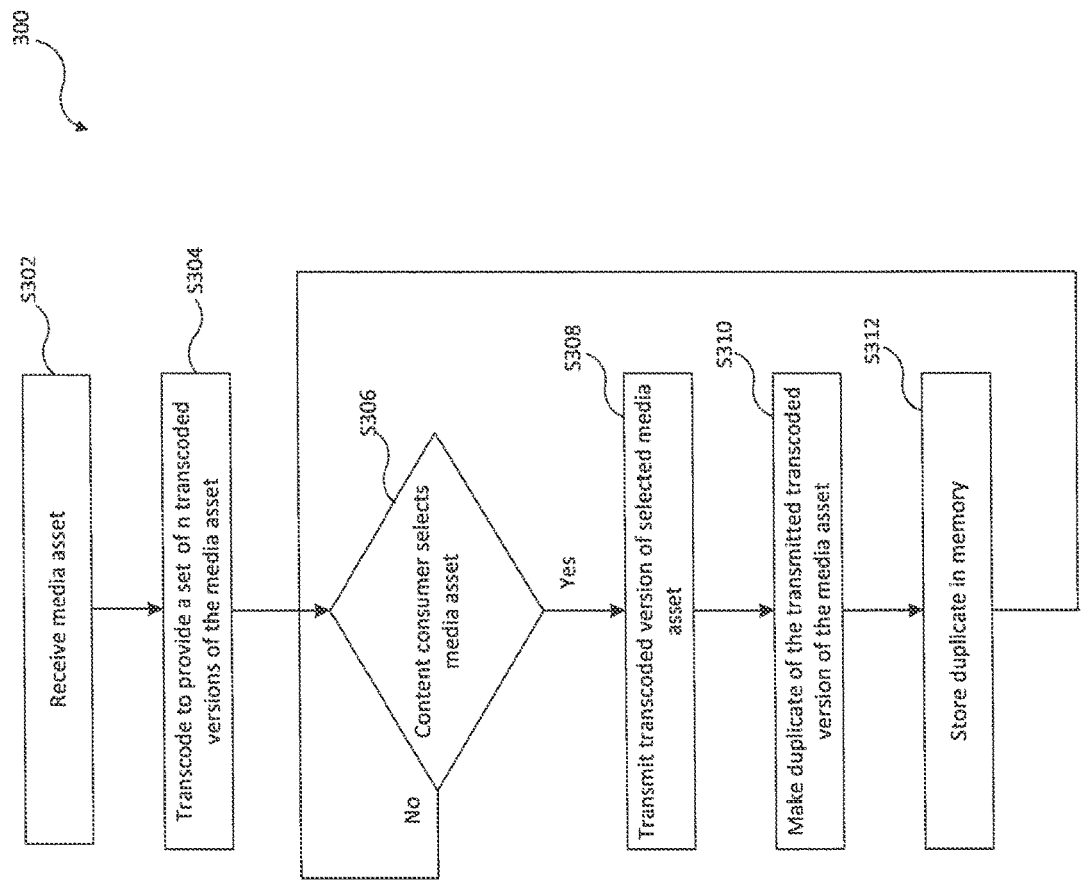
FIG. 3 is a flow chart for a process of delivering content to consumers.

Reference is now made to FIGS. 2 and 3 which illustrate how a media asset is delivered by the content delivery system 106 to a plurality of content consumers.

As shown in FIG. 2, the content delivery system 106 comprises a media asset receiver 202 for receiving a media asset in a received format, the media asset being, for example, an episode of a television show, a movie, or a recording of a sports event (e.g. football match) etc. As used herein, the term "received format" is used herein to refer to an encoding format and/or resolution and/or any other characteristic or attribute of the original media asset received by the media asset receiver 202. The media asset receiver is coupled to a transcoder 204, the transcoder 204 is configured to receive the media asset from the media asset receiver 204.

The transcoder 204 is configured to transcode the media asset to provide a predetermined number of transcoded versions of the media asset in at least one consumption format. The provider of the content delivery system determines the number of copies that the transcoder 204 makes, as will be described in further detail herein. As used herein, the term "consumption format" is used herein to refer to an encoding format and/or resolution and/or any other characteristic or attribute of the transcoded versions of the media asset provided by the transcoder 204.

The transcoder 204 is coupled to a memory 206 (e.g. in the form of a non-transitory computer readable medium such as electronic or magnetic memory). The transcoder 204 supplies the predetermined number of transcoded versions of the media asset to the memory 206 for storage therein.

The content delivery system 106 is arranged to transmit data to each of the media consuming devices to display selectable options corresponding to each of the media assets stored in memory 106. These selectable options may for example be displayed in an Electronic Programming Guide, or may be displayed on a webpage.

A content consumer is able to select one of the displayed selectable options which corresponds to the media asset that they want to view. This selection is made using an input device (not shown in FIG. 1) of the media consuming device associated with the content consumer. The input device may be for example a remote control, keyboard, touch screen or infra-red depth sensor able to detect gesture commands or any other input device well known to persons skilled in the art. The media asset selection is communicated from the media consuming device to the content delivery system 106 via the appropriate communication channel (e.g. via the packet based network 103, cable connection 113, or satellite connection 123).

The content delivery system 106 comprises a media asset selection detection module 212 which is configured to detect a media asset selection by a content consumer. The media asset selection detection module 212 is coupled to a media asset transmitter 210. The media asset selection detection module 212 is configured to supply an indication of the selected media asset to a media asset transmitter 210.

The media asset transmitter 210 is coupled to the memory 206. In response to receiving the indication of the selected media asset from the media asset selection detection module 212, the media asset transmitter 210 is configured to retrieve a transcoded version of the predetermined number of transcoded version of the selected media asset from the memory 206 and transmit the transcoded version of the media asset to the media consuming device.

The content delivery system 106 further comprises a media asset duplication module 208. The media asset duplication module 208 is coupled to the memory 206 and the media asset transmitter 210. The operation of the media asset duplication module 208 will be described in further detail with reference to FIG. 3.

FIG. 3 is a flow chart for a process 300 of delivering a media asset to content consumers.

The process starts at step S302, where the media asset receiver 202 receives a media asset in a received format. Typically, the received media asset is a full size, high quality source file (a master file) that is intended for transcoding (often referred to as a Mezzanine file).

The media asset receiver 202 may receive the original media asset in a number of ways that will be apparent to persons skilled in the art. For example, the media asset may be stored by a content provider in a data store in the packet based network 103 that is provided by a File Transfer Protocol (FTP) storage provider. The media asset may have been broadcast as a linear asset prior to step S302 and made available by the content provider for retrieval from the data store by the media asset receiver 202 once the media asset has finished airing linearly. In this example the media asset receiver 202 may be configured to query the data store in the packet based network 103 at predetermined intervals to determine whether new media assets (not previously retrieved by the media asset receiver 202) are available for retrieval by the media asset receiver 202, and retrieve any new media assets.

As described above, the media asset receiver 202 supplies the media asset to the transcoder 204. At step S304 the transcoder 204 transcodes the media asset to provide a predetermined number (e.g. 10,000) of transcoded versions of the media asset in at least one consumption format.

This initial pool of transcoded versions of the media asset is stored in memory 206. Once the transcoding is complete, a selectable option corresponding to the media asset is displayed to the content consumers on their respective media consuming devices.

At step S306, the content delivery system 106 determines if a content consumer has selected to view the media asset.

In response to the media asset selection detection module 212 detecting selection of the media asset by a first consumer 104 at step S306, the media asset selection detection module 212 supplies an indication of the selected media asset to the media asset transmitter 210, and the process proceeds to step S308.

At step S308, the media asset transmitter 210 retrieves one of the transcoded versions from the initial pool of transcoded versions of the selected media asset from the memory 206 and transmits the retrieved transcoded version of the media asset to the media consuming device 102.

The media asset transmitter 210 is configured to transmit an indication of the transmitted transcoded version of the media asset to the asset duplication module 208. At step S310, in response to receiving the indication of the transmitted transcoded version of the media asset from the media asset transmitter 210, the asset duplication module 208 creates a duplicate of the transcoded version of the media asset whilst it is being transmitted (whilst it is airing) and at step S312 stores the duplicate of the transmitted transcoded version of the media asset created at step S310 in memory 206.

As shown in FIG. 3, the step S306, S308, S310 and S312 are repeated as content consumers select to view the media asset. For example, once the second consumer 114 selects to view the media asset, a second transcoded version of the media asset is retrieved from the initial pool of transcoded versions of the media asset and transmitted to the media consuming device 112 and the asset duplication module 208 creates a duplicate of the transmitted transcoded version of the media asset and stores the created duplicate of the transmitted transcoded version of the media asset in memory 206, and so on.

The transcoder 204 may provide the predetermined number of transcoded versions of the media asset in a single consumption format (e.g. all of the predetermined number of transcoded versions are of the same consumption format).

In this example, the initial pool of transcoded versions of the media asset stored in memory 206 is transmitted to the first 10,000 content consumers that select to view the media asset (each receive one transcoded version of the pool of transcoded versions of the media asset). The next 10,000 content consumers that select to view the media asset each receive a duplicate of the initial pool of transcoded versions of the media asset (and so on).

As will be apparent to persons skilled in the art, a particular media consuming device may only support (e.g. be able to decode) media assets of certain encoding formats. Similarly, high resolution media assets will be visually attractive on high resolution screens but could perform poorly or not be able to be displayed at all on lower resolution screens, and lower resolution media assets may be able to be displayed across many different media consuming devices however could provide poor picture quality when displayed on media consuming devices with larger screens.

In other embodiments, the transcoder 204 provides the predetermined number of transcoded versions of the media asset in a plurality of different consumption formats.

For example, the transcoder 204 may provide the predetermined number of transcoded versions of the media asset in a plurality of different encoding formats. The encoding formats may include for example MPEG-2, MPEG-4, H.264, Theora, VP8 or any other encoding format known to persons skilled in the art.

Alternatively or additionally, the transcoder 204 may provide the predetermined number of transcoded versions of the media asset in a plurality of different resolutions.

The provider of the content delivery system 106 may use analytics to determine the appropriate number of transcoded versions of the media asset in each consumption format (in the initial pool of transcoded versions of the media asset). For example the provider of the content delivery system 106 may determine from historical viewing data that the majority of viewing is conducted on televisions rather than on smartphones and therefore provide a larger proportion of transcoded versions of the media asset in a consumption format suitable for playback on a television than the proportion of transcoded versions of the media asset in a consumption format suitable for playback on a mobile phone.

The media asset selection detection module 212 is configured to detect capabilities of each media consuming device that is associated with a content consumer that selected the media asset, based on information in the media asset selection transmitted from each media consuming device to the media asset selection detection module 212

The detected capabilities of a media consuming device may for example comprise information on at least one encoding format supported by the media consuming device and/or information on at least one resolution supported by the media consuming device. The detected capabilities may include other device capabilities not referred to herein.

The media asset selection detection module 212 is configured to supply an indication of the detected capabilities of each media consuming device that is associated with a content consumer that selected the media asset to the media asset transmitter 210. The media asset transmitter 210 is configured to retrieve a transcoded version of the media asset from memory 206 for transmission to a media consuming device based on the detected capabilities of the particular media consuming device.

This enables the content delivery system 106 to provide a transcoded version of a media asset to different types of media consuming device in a form suitable for playback at the particular media consuming device.

Whilst the process 300 has been described above with providing a single media asset as an on-demand asset, the process 300 may be performed by the content delivery system 106 for a plurality of media assets. This enables every media asset (e.g. TV show, movie etc.) to be available to everyone (all of the content consumers) all of the time.

It will be appreciated that embodiments of the present disclosure advantageously allow the content delivery system 106 to provide an on-demand delivery service of media assets without requiring large amounts of data storage whilst still complying with the uniqueness rule in the contractual obligations with content owners/providers.

Whilst step S304 was described above with reference to the transcoder providing 10,000 transcoded versions of the received media asset, this is merely an example.

Because steps S308 and S310 happen in parallel, there must be sufficient transcoded versions of the media assets in the initial pool (created at step S304) to ensure duplicates of the transcoded versions of the media asset can be produced quickly enough to have unique copies for everyone (in order to comply with the contractual obligations). The starting initial pool of transcoded versions of media assets would need to be larger for popular TV shows and smaller for less popular TV shows.

After the media asset transmitter 210 retrieves a transcoded version of a media asset from the memory 206, the transcoded version of the media asset may be immediately deleted from the memory 206 (this complies with the uniqueness rule in the contractual obligations with content owners/providers).

Alternatively, after the media asset transmitter 210 retrieves a transcoded version of a media asset from the memory 206, the transcoded version of the media asset may be deleted from memory 206 after a period of time. This period of time may be predetermined for a particular media asset (e.g. a few hours to a few days to account for someone else in the household watching the media asset). Alternatively, this period of time may be determined based on a content consumer's viewing history (e.g. if viewship shows that a content consumer watches episodes of a particular TV show multiple times in a row (this is unlikely), episodes of the TV show may be cached in memory 206 for a week and then deleted). The content delivery system 106 simply has to ensure that no two content consumers ever view the same transcoded version of the media asset, though it is ok if a single content consumer views two different transcoded versions of the same episode (for example, if they view the episode today and in six months' time).

The provider of the content delivery system 106 may use analytics to determine an appropriate size for the initial pool of transcoded versions of the media asset for a given window (period of time) and media asset. For example a recently aired episode of a hit TV show made available for selection by the content delivery system 106 within a few days of airing needs a very large pool (e.g. 100 k-500 k transcoded versions of the episode). An episode of popular TV show that aired some years ago will need a smaller pool (e.g. 1000 transcoded versions of the episode). An episode of an unpopular TV show that aired some years ago will need an even smaller pool (e.g. 1 transcoded version of the episode).

The analytics may comprise for example analysis of historical viewing statistics of prior episodes of the media asset.

Duplicates of transcoded versions of the media asset may be retrieved from the memory 206 by the media asset transmitter 210 and a duplicate created therefrom in the same manner as described above (if for example there is no longer any of the initial pool of transcoded versions of the media asset available in the memory 206).

Whilst it has been described above that the media asset received by the content delivery system may have been broadcast as a linear asset prior to step S302, embodiments of the present disclosure are not limited to such assets.

While reference has been made above to media assets being video content, the media assets may also be audio content (for example a radio show, podcast, audio book), or text-based content (e.g. an e-book).

The functional blocks shown in FIG. 2 may be components of a single computing device (e.g. a server) or distributed over multiple computing devices, for example in a "cloud computing" environment.

Any of the functionality described herein can be implemented using software, firmware, hardware (e.g., fixed logic circuitry), or a combination of these implementations. The terms "module", "functionality", and "component" as used herein generally represent software, firmware, hardware, or a combination thereof. In the case of a software implementation, the module or functionality represents program code that performs specified tasks when executed on a processor (not shown in the Figures). The program code can be stored in one or more computer readable memory devices.

It will be appreciated that the above embodiments have been described only by way of example, and other variants or applications may be apparent to a person skilled in the art given the disclosure herein.

The present invention is not limited by the described examples but only by the appendant claims. Any reference signs in the claims should not be construed as limiting the scope.

What is claimed is:

1. A content delivery system comprising:
a processor;
a memory with computer code instructions stored thereon;
a receiver for receiving a media asset in a received format;
a transcoder for receiving the media asset from the receiver and transcoding the media asset to provide a predetermined plurality of transcoded copies of the media asset in one consumption format;
the processor and the memory, with the computer code instructions implementing a data store storing the predetermined plurality of transcoded copies of the media asset in the one consumption format;
a transmitter, coupled to said data store, for retrieving one of the predetermined plurality of transcoded copies of the media asset from the data store and transmitting the retrieved transcoded copy to a media consuming device in response to detecting selection of the media asset by a content consumer associated with said media consuming device;
the processor and the memory, with the computer code instructions, preventing transmitting of the same transcoded copy of the media asset to a further content consumer;
the processor and the memory, with the computer code, implementing analytics to determine an appropriate number of transcoded copies of the media asset in the one consumption format;
a media asset duplication module responding to detecting transmission of the transcoded copy of the media asset to the media consuming device and the implemented analytics, to selectively create and store a duplicate of the transmitted copy in the data store,
wherein the predetermined plurality of transcoded copies of the media asset in the data store is sufficient to ensure duplicates of the media asset can be produced quickly enough to provide a unique copy of the media asset in response to each selection of the media asset, and
wherein a number of transcoded copies in the data store available for transmission responsive to a selection of the media asset is maintained at the predetermined plurality after creating and storing the duplicate of the transmitted copy in the data store.

2. The content delivery system of claim 1 wherein preventing transmitting of the same transcoded version of the media asset to a further content consumer comprises deleting the transcoded copy following retrieval from the data store.

3. The content delivery system of claim 1 wherein the transmitter is further configured for retrieving one of the duplicate transcoded copies and for transmitting the retrieved transcoded copy in response to detecting selection of the media asset.

4. The content delivery system of claim 1, wherein the transcoder transcodes the media asset to provide the predetermined plurality of transcoded copies of the media asset in one encoding format, and the media asset duplication module is further configured, in response to detecting transmission of each transcoded copy of the predetermined plurality of transcoded copies of the media asset, to detect the encoding format of the transmitted copy and create the duplicate of the transcoded copy in the detected encoding format.

5. The content delivery system of claim 1, wherein the transcoder transcodes the media asset to provide the predetermined plurality of transcoded copies of the media asset in one resolution, and the media asset duplication module is further configured, in response to detecting transmission of each transcoded copy of the predetermined plurality of transcoded copies of the media asset, to detect the resolution of the transmitted copy and create the duplicate of the transcoded copy in the detected resolution.

6. The content delivery system of claim 5, wherein the transmitter further detects capabilities of the media consuming device associated with a content consumer that selected the media asset, and for the media consuming device the consumption format of the retrieved transcoded copy of the media asset is selected for retrieval based on the detected capabilities of the media consuming device.

7. The content delivery system of claim 6, wherein when the capabilities of the media consuming device comprise a plurality of different consumption formats, the system being enabled for providing the media asset in one of those consumption formats different to the consumption format requested.

8. The content delivery system of claim 6, wherein the detected capabilities comprise information on at least one encoding format supported by the media consuming device.

9. The content delivery system of claim 6, wherein the detected capabilities comprise information on at least one resolution supported by the media consuming device.

10. The content delivery system of claim 2, wherein the deletion of the transcoded copy of the media asset occurs after a predetermined period of time following retrieval from the data store, the predetermined period of time set by a provider of the content delivery system.

11. The content delivery system of claim 1, wherein the receiver receives the media asset after the media asset has been broadcast as a linear asset.

12. The content delivery system of claim 1, further comprising the processor executing a media asset selection detection module detecting selection of the media asset by the content consumer associated with said media consuming device, and supply an indication of the media asset to the media asset transmitter.

13. The content delivery system of claim 1, wherein the content delivery system communicates with at least one of the one or more media consuming devices via a cable connection.

14. The content delivery system of claim 1, wherein the content delivery system communicates with at least one of the one or more media consuming devices via a satellite connection.

15. A computer implemented method of delivering content from a content delivery system, the method comprising:
receiving a media asset at a receiving module in a received format;
transcoding the media asset to provide a predetermined plurality of transcoded copies of the media asset in one consumption format;
storing the predetermined plurality of transcoded copies of the media asset in the at least one consumption format in a data store;
retrieving one of the predetermined plurality of transcoded copies of the media asset from the data store and transmitting said retrieved transcoded copy to a media consuming device in response to detecting selection of the media asset by a content consumer associated with said media consuming device;
preventing transmitting of the same transcoded copy of the media asset to a further content consumer following transmitting of the transcoded copy to the media consuming device;
implementing analytics to determine an appropriate number of transcoded copies of the media asset in the one consumption format; and
in response to detecting transmission of the transcoded copy of the media asset to the media consuming device and in response to the analytics, selectively creating a duplicate of the transmitted copy and storing the duplicate in the data store,
wherein the predetermined plurality of transcoded copies of the media asset in the data store is sufficient to ensure duplicates of the media asset can be produced quickly enough to provide a unique copy of the media asset in response to each selection of the media asset, and
wherein a number of transcoded copies in the data store available for transmission responsive to a selection of the media asset is maintained at the predetermined plurality after creating and storing the duplicate of the transmitted copy in the data store.

16. A computer program product for delivering content from a content delivery system, the computer program product being embodied on a non-transitory computer-readable medium and, when executed on one or more processors causes the one or more processors to:
receive a media asset at a receiving module in a received format;
transcode the media asset to provide a predetermined plurality of transcoded copies of the media asset in at least one consumption format;
store the predetermined plurality of transcoded copies of the media asset in the at least one consumption format in a data store;
receive one of the predetermined plurality of transcoded copies of the media asset from the data store and transmitting said retrieved transcoded copy to a media consuming device in response to detecting selection of the media asset by a content consumer associated with said media consuming device;
prevent transmitting of the same transcoded copy of the media asset to a further content consumer following transmittal of the transcoded copy to the media consuming device;
implementing analytics to determine an appropriate number of transcoded copies of the media asset in the one consumption format; and
in response to detecting transmission of the transcoded copy of the media asset to the media consuming device and in response to the analytics, selectively create a duplicate of the copy that is transmitted and storing the duplicate in the data store,
wherein the predetermined plurality of transcoded copies of the media asset in the data store is sufficient to ensure duplicates of the media asset can be produced quickly enough to provide a unique copy of the media asset in response to each selection of the media asset, and
wherein a number of transcoded copies in the data store available for transmission responsive to a selection of the media asset is maintained at the predetermined plurality after creating and storing the duplicate of the transmitted copy in the data store.

* * * * *